(12) United States Patent
Geidenmark

(10) Patent No.: US 8,505,112 B2
(45) Date of Patent: Aug. 13, 2013

(54) DIVING SUIT

(75) Inventor: Kristin Geidenmark, Trelleborg (SE)

(73) Assignee: Ansell Protective Solutions AB, Trelleborg (SE)

( * ) Notice: Subject to any disclaimer, the term of this patent is extended or adjusted under 35 U.S.C. 154(b) by 672 days.

(21) Appl. No.: 12/656,712

(22) Filed: Feb. 16, 2010

(65) Prior Publication Data

US 2010/0146678 A1     Jun. 17, 2010

Related U.S. Application Data

(62) Division of application No. 11/485,329, filed on Jul. 13, 2006.

(60) Provisional application No. 60/702,611, filed on Jul. 27, 2005.

(30) Foreign Application Priority Data

Jul. 27, 2005  (SE) ..................................... 0501789

(51) Int. Cl.
    *B63C 11/04* (2006.01)
(52) U.S. Cl.
    USPC ............................................................ 2/2.15
(58) Field of Classification Search
    USPC ................ 2/456, 69, 2.15, 2.16, 69.5, 81, 82
    See application file for complete search history.

(56) References Cited

U.S. PATENT DOCUMENTS

| | | | |
|---|---|---|---|
| 3,660,849 | A | 5/1972 | Jonnes et al. |
| 4,416,027 | A | 11/1983 | Perla |
| 4,826,721 | A | 5/1989 | Obrecht et al. |
| 5,075,388 | A | 12/1991 | Rempel et al. |
| 6,514,590 | B1 | 2/2003 | Shih |
| 2004/0166346 | A1 | 8/2004 | Achten |

FOREIGN PATENT DOCUMENTS

| | | |
|---|---|---|
| CN | 1530390 | 9/2004 |
| EP | 1 108 528 | 6/2001 |
| EP | 1 352 577 | 10/2003 |
| GB | 946748 | 1/1964 |
| GB | 2020164 | 11/1979 |
| GB | 2 308 968 | 7/1997 |
| JP | 57-128732 | 10/1982 |
| JP | 2004076245 A | 8/2002 |

OTHER PUBLICATIONS

U.S. Office Action dated Mar. 29, 2010 for corresponding U.S. Appl. No. 11/485,329.
"Hydrogenerat nitrilgummi—HNBR," Plastforum, nordica, nr 10, 2002, Lars-Erik Edshammar: "Material Skolan del 47," pp. 51-53.
U.S. Office Action dated Jul. 20, 2010 for corresponding U.S. Appl. No. 11/485,329.
Supplementary European Search Report mailed Sep. 27, 2012 for EP Application No. 06758044.9.

*Primary Examiner* — Tejash Patel
(74) *Attorney, Agent, or Firm* — Moser Taboada

(57) ABSTRACT

A diving suit made of a rubber material comprising HNBR (hydrogenated nitrile butadiene rubber) is disclosed, as well as a process for the production of the diving suit and the use of HNBR in a rubber material of a diving suit for use in contaminated water.

10 Claims, No Drawings

DIVING SUIT

PRIORITY STATEMENT

This application is a divisional of U.S. patent application Ser. No. 11/485,329 filed on Jul. 13, 2006 which claims priority under 35 U.S.C. §119 on Swedish application SE-0501789-2 filed Jul. 27, 2005, and on U.S. provisional patent application No. 60/702,611 filed Jul. 27, 2005, the entire contents of each of which is hereby incorporated herein by reference.

FIELD

The present invention generally relates to a diving suit, to a process for the production of the diving suit and to the method of using a rubber material in a diving suit for use in contaminated water.

BACKGROUND ART

Diving suits suitable for use in contaminated water are presently made of natural rubber and ethylene propylene diene monomer (EPDM). For example, a commercial rubber suit is a suit made of natural rubber with a mix of EPDM. During production, the rubber is first coated onto a polyester lining. The suit is sewn together, then the seams are covered with rubber tapes and the resulting whole suit is vulcanized. This vulcanizing procedure results in a suit with chemical bonding between the rubber coated fabric and the rubber tape. This means a continuous rubber material through the suit. There is no gluing involved in the seams. Vulcanized rubber suits are usually made from rubber material and knitted fabric of 1000-1500 g/m$^2$ totally, with extra rubber material in high wear areas.

It is well known that diving suits for use in contaminated water need to fulfil strict requirements. These suits provides a protection against cold, chemicals and biological hazards and also give protection against mechanicals. Vulcanized rubber dry suits are recommended for use in contaminated water by EPA (Environmental Protection Agency), NOAA (National Oceanographic and Atmospheric Administration), TRI (Texas Research Institute) and the US Navy.

To achieve a proper protection it is possible to use an ordinary diving suit in combination with a chemical protective suit and duct tape when diving in contaminated waters. However, this is not desirable. When diving, flexibility and freedom of movement are of great importance. The flexibility is, however, limited by the use of two suits.

Other suits used for contaminated water are suits made of laminated plastics, e.g. trilaminate. These suits are, however, less suited for diving since the materials are not sufficiently flexible and stretchable, and therefore hinder movement. Moreover, the material and the seams of trilaminate suits have a characteristic of leaking. Water can penetrate both material and seams. In the seams, water can penetrate through the exposed threads. At the end of a dive you will find moisture and water drops on the inside of the suit. Another problem is to handle decontamination, which is very difficult or even impossible due to that contaminants can get trapped in the polyamide fabric. If the contaminants get trapped in the polyamide they will break down the layer of butyl rubber in between. Remaining contaminants form a possible danger to people handling the suit after the dive. Substances like oil and grease will leave spots or stains which can not be removed.

Another material sometimes used in diving suits is Neoprene®. Neoprene suits can, however, not be decontaminated, creating several problems when diving in contaminated water. Contaminants are trapped in the neoprene and can be absorbed by personnel handling the suits after operations. The trapped contaminants will also break down the material, dramatically reducing its usable life. Substances such as oil cause spots and stains that can not be removed.

Further materials used in rubber materials for diving suits are mixtures of natural rubber with EPDM and chloroprene rubber materials.

Rubber materials for diving suits known in the state of art do not exhibit good permeation and mechanical resistance, for abrasion as well as puncture, at the same time and still have good flexibility.

Thus, it is desirable to produce a diving suit that exhibits good resistance against chemicals, a good mechanical resistance, for abrasion and puncture, and still is flexible and stretchable and keeps the user dry, for use of the suit in contaminated waters. The suit must also be possible to decontaminate.

SUMMARY

The above stated problem with diving suits that do not have a good resistance against chemicals while at the same time have a good flexibility and a good resistance against mechanical damage is improved upon or even solved with a diving suit according to at least one embodiment of the present invention.

At least one embodiment of the present invention relates to a diving suit of a rubber material, wherein the rubber material comprises HNBR (hydrogenated nitrile butadiene rubber). The protective material comprising HNBR has a good resistance against chemicals. Moreover, the material exhibits good resistance against mechanical damage, a good puncture resistance as well as a good abrasion resistance, and at the same time is very flexible.

Furthermore, at least one embodiment of the present invention relates to a process for the production of a diving suit with the characteristics stated above, wherein a rubber material comprising HNBR is calendered, cut into pieces of a suit, said suit is sewn together with seams, the seams of the suit are covered with a rubber tape and the resulting whole suit is vulcanized.

At least one embodiment of the present invention also relates to the use of HNBR in a rubber material of a diving suit for use in contaminated water.

DETAILED DESCRIPTION OF THE EXAMPLE EMBODIMENTS

At least one embodiment of the present invention relates to a protective rubber material for use in diving suits for contaminated water. The expression contaminated water normally means aqueous solutions comprising components hazardous to the environment, animals or man, but may also imply other media or liquids.

The rubber material exhibits good resistance against chemicals, wear and puncture, which are required for diving suits for use in contaminated water. Moreover, the material gives the diving suit good flexibility. The increased resistance indicates that a thinner sheet of the material can be used for the manufacture of suits with maintained resistance in comparison to suits according to state of the art.

The rubber material of the diving suit according to at least one embodiment of the invention is a rubber material based on HNBR (hydrogenated nitrile butadiene rubber). HNBR is produced from the hydrogenation of NBR, i.e. nitrile butadiene rubber. The basic structure of an HNBR elastomer, i.e. polymer, is provided below, wherein x>0 y>0, z>0 and x>z.

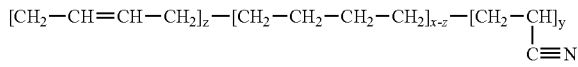

The rubber material used in at least one embodiment of the present invention may include a mix of HNBR with different values of x, y and z according to the formula above. Moreover, modifications, variants and derivates thereof having the same or essentially the same characteristics may be used.

The rubber material used in at least one embodiment of the present invention comprises different components in addition to the HNBR polymer, e.g. fillers, plasticizers and curing agents. All weight percents (w/w) stated herein are based on the weight of the component in question in relation to the total weight of the rubber material including the HNBR.

In one example embodiment the rubber material comprises 40-70% HNBR. HNBR contents of 45, 50, 55, 60, 65% (w/w) are also useful in a diving suit according to at least one embodiment of the present invention.

In another example embodiment the rubber material comprises 40-70% (w/w) HNBR and 5-60% (w/w) of at least one filler.

In another example embodiment the rubber material according to the present invention comprises 5-30% (w/w) of at least one plasticizer.

In a further example embodiment the rubber material according to the present invention comprises 2-10% (w/w) of at least one curing agent.

Conventional fillers, plasticizers and curing agents can be used in example embodiments the present invention. An example of a filler in the rubber material of the diving suit of an example embodiment of the present invention is carbon black.

The rubber material included in the diving suit according to an example embodiment of the present invention can be produced according to conventional techniques used today in production of rubber materials.

In one example embodiment the diving suit comprises an inner fabric that comprises polyester.

In another example embodiment the diving suit comprises reinforcements on shoes, shoulders, crotch, elbows, knees and/or legs. This is to withstand the wear and tear of the equipment on some of the more exposed areas even better.

The diving business today does not use nitrile rubber for the manufacture of diving suits. Because of the poor weather resistance of nitrile rubber this material has not been suitable for diving suits. The rubber material used in example embodiments of the present invention and comprising hydrogenated nitrile butadiene rubber, however, exhibits good weather resistance and thus is effective and suitable as a material in diving suits.

The diving suit according to an example embodiment of the present invention is produced in a couple of steps. The rubber material comprising HNBR is calendered, cut into pieces of a suit, said suit is sewn together with seams, the seams of the suit are covered with a rubber tape and the resulting whole suit is vulcanized.

In one example embodiment of the process for the production of a diving suit according to the present invention the rubber material comprises 40-70% HNBR (w/w), 5-60% (w/w) of at least one filler, 5-30% (w/w) of at least one plasticizer and 2-10% (w/w) of at least one curing agent.

In another example embodiment of the process for the production of the diving suit, the rubber material is joined together with an inner fabric comprising polyester before the suit is sewn together.

In one example embodiment of the process for the production of the diving suit, the diving suit is reinforced on shoes, shoulders, crotch, elbows, knees and/or legs.

At least one example embodiment of the present invention also relates to the use of HNBR in a rubber material of a diving suit for use in contaminated water.

Here as well, one example embodiment is to use a rubber material comprising 40-70% (w/w) HNBR, 5-60% (w/w) of at least one filler, 5-30% (w/w) of at least one plasticizer and 2-10% (w/w) of at least one curing agent. Carbon black is an example of a filler in the rubber material used in the process for the production of the diving suit.

EXAMPLES

Permeation and Puncture Tests

Permeation and puncture tests were performed on three different materials. Material 1 is a material with a mix of natural rubber and ethylene propylene diene monomer (EPDM) and material 2 is a chloroprene rubber material. Both materials are materials that are being used in commercially available diving suits today. Material 3 is the material according to at least one example embodiment of the present invention, i.e comprising HNBR.

The permeation tests were performed according to the European Norm EN374-3:2003. Table 1 below shows the results of the permeation tests. Different chemicals were tested on the material. Table 1 shows the time in minutes from the start of the test to the breakthrough of the material begins, i.e. breakthrough time, for N-hexane, toluene, JP4 and JP8 (both jet fuels), liquid B, C and F (see definitions below) and $H_2SO_4$ (65%).

Liquid B is a liquid to simulate low octane motor gasoline. (70/30 isooctane/toluene)

Liquid C is a liquid to simulate high octane motor gasoline. (50/50 isooctane/toluene)

Liquid F is a liquid to simulate diesel fuel and light heating oil. (80/20 paraffin oil/methylnaphtalene)

The breakthrough time is deemed to have occurred when the analytical equipment detects a permeation rate of 1.0 $\mu g/cm^2/min$.

Material 1, 2 and 3 had different weights per $m^2$. The weight per $m^2$ of material 1 and 3 was 1000-1100 $g/m^2$ and the weight of material 2 was 1500-1600 $g/m^2$. The breakthrough time is of course dependent on the weight of the material. A higher weight gives a higher breakthrough time. For a totally correct comparison the tests should have been made on a material 2 with the same weight per $m^2$ as material 1 and 3. In other words, the breakthrough time results of material 2 shown in table 1 should have been lower if the permeation tests had been performed with a material 2 of the same weight per $m^2$ as material 1 and 3.

Table 1 shows that material 3, the rubber material according to at least one example embodiment of the present invention, has a higher breakthrough time than material 1 and 2 for all the tested chemicals, except for Liquid F and $H_2SO_4$ (65%), where the results are just as high on material 3 as on material 1 and 2. The differences for some of the tested chemicals were surprisingly high. One example is for JP4 and JP8 where the breakthrough times on material 1 were 47 and 40 minutes, respectively, on material 2, 75 and 160 minutes, respectively, but on the material according to the present invention, material 3, as high as more than 480 minutes for both fuels. In comparison to material 2 one should also remember that the weight per m² of material 2 was considerably higher than of material 3.

TABLE 1

Permeation tests according to EN 374-3:2003, breakthrough time in min

|  | Material 1 (1000-1100)g/m² | Material 2 (1500-1600)g/m² | Material 3 (1000-1100)g/m² |
|---|---|---|---|
| N-hexane | 10 min | 42 min | 250 min |
| Toluene | 12 min | 19 min | 38 min |
| JP4, Jet fuel | 47 min | 75 min | >480 min |
| JP8, Jet fuel | 40 min | 160 min | >480 min |
| Liquid B | 12 min | 35 min | 122 min |
| Liquid C | 10 min | 31 min | 74 min |
| Liquid F | >480 min | >480 min | >480 min |
| $H_2SO_4$ (65%) | >480 min | >480 min | >480 min |

Puncture tests according to EN 863:1995 on material 1, 2 and 3 were performed. The results of the force in Newton (N) for puncture are shown in table 2 below. The material according to at least one example embodiment of the invention, material 3, shows the highest puncture resistance. Even in this case the weight per m² of the material is of some importance, i.e. a higher weight per m² of the rubber material leads to a higher puncture resistance. In other words, the result of material 2 should have been lower if the puncture test had been performed with a material 2 of the same weight per m² as material 1 and 3.

TABLE 2

Puncture tests according to EN 863:1995

|  | Material 1 (1000-1100)g/m² | Material 2 (1500-1600)g/m² | Material 3 (1000-1100)g/m² |
|---|---|---|---|
| Puncture resistance (N) | 60-64 N | 65 N | 69 N |

CONCLUSIONS

The rubber material comprising HNBR according to at least one example embodiment of the present invention is flexible as well as exhibits a good resistance against chemicals, wear and tear. In comparison to the other tested materials, material 1 which is a material of natural rubber with a mix of ethylene propylene diene monomer (EPDM) and material 2 which is a chloroprene rubber material, the rubber material according to this invention has surprisingly much better resistance against chemicals and higher puncture resistance. These surprisingly good characteristics of being flexible, having a good mechanical resistance and still exhibiting a good resistance against chemicals, makes the rubber material according to at least one example embodiment of the present invention very suitable as a rubber material for diving suits for contaminated water.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A diving suit having as a permeant barrier a layer of a rubber material comprising 40-70% HNBR (hydrogenated nitrile butadiene rubber).

2. The diving suit according to claim 1, wherein said rubber material comprises 5-60% (w/w) of at least one filler.

3. The diving suit according to claim 2, wherein said at least one filler is carbon black.

4. The diving suit according to claim 1, wherein said rubber material comprises 5-30% (w/w) of at least one plasticizer.

5. The diving suit according to claim 1, wherein said rubber material comprises 2-10% (w/w) of at least one curing agent.

6. The diving suit according to claim 1, wherein said rubber material comprises 5-60% (w/w) of at least one filler, 5-30% (w/w) of at least one plasticizer and 2-10% (w/w) of at least one curing agent.

7. The diving suit according to claim 1, wherein the rubber material has a weight of 1000-1100 g/m2 and has a puncture resistance of more than 64 N.

8. The diving suit according to claim 1, wherein said diving suit comprises an inner fabric.

9. The diving suit according to claim 8, wherein said inner fabric comprises polyester.

10. The diving suit according to claim 1, wherein said diving suit comprises reinforcements on shoes, shoulders, crotch, elbows, knees and/or legs.

* * * * *